United States Patent
Pellegatti et al.

(10) Patent No.: US 8,802,781 B2
(45) Date of Patent: Aug. 12, 2014

(54) POLYMER COMPOSITION

(75) Inventors: Giampaolo Pellegatti, Boara (IT); Davide Micheletti, Bologna (IT); Shahram Mihan, Bad Soden (DE); Fabiana Fantinel, Frankfurt (DE); Gerd Mannebach, Münstermaifeld (DE)

(73) Assignee: Basell Poliolefine Italia S.r.l., Milan (IT)

(*) Notice: Subject to any disclaimer, the term of this patent is extended or adjusted under 35 U.S.C. 154(b) by 370 days.

(21) Appl. No.: 13/143,963

(22) PCT Filed: Jan. 4, 2010

(86) PCT No.: PCT/EP2010/050015
§ 371 (c)(1),
(2), (4) Date: Jul. 11, 2011

(87) PCT Pub. No.: WO2010/081753
PCT Pub. Date: Jul. 22, 2010

(65) Prior Publication Data
US 2011/0269893 A1 Nov. 3, 2011

Related U.S. Application Data

(60) Provisional application No. 61/205,227, filed on Jan. 20, 2009.

(30) Foreign Application Priority Data

Jan. 13, 2009 (EP) .................................. 09150470

(51) Int. Cl.
*C08L 23/20* (2006.01)
*C08L 23/24* (2006.01)
(52) U.S. Cl.
USPC ........................... 525/240; 524/528; 526/351
(58) Field of Classification Search
USPC ........................... 525/240; 524/528; 526/351
See application file for complete search history.

(56) References Cited

U.S. PATENT DOCUMENTS

| | | | |
|---|---|---|---|
| 3,242,150 A | 3/1966 | Scoggin | |
| 3,248,179 A | 4/1966 | Norwood | |
| 4,245,062 A | 1/1981 | Suzuki | |
| 4,521,566 A | 6/1985 | Galli | |
| 4,734,459 A | 3/1988 | Cecchin | |
| 5,350,807 A | 9/1994 | Pettijohn et al. | |
| 5,360,868 A | 11/1994 | Mosier et al. | |
| 6,441,081 B1 | 8/2002 | Sadatoshi | |
| 6,673,869 B2 | 1/2004 | Silvestri et al. | |
| 6,953,829 B2 | 10/2005 | Kratzer | |
| 7,101,940 B2 | 9/2006 | Schottek | |
| 7,649,052 B2 | 1/2010 | Massari et al. | |
| 7,767,613 B2 | 8/2010 | Mihan | |
| 7,928,051 B2 | 4/2011 | Kipke et al. | |
| 8,008,403 B2 | 8/2011 | Kipke et al. | |
| 8,222,356 B2 | 7/2012 | Kipke et al. | |
| 8,563,674 B2 | 10/2013 | Mihan | |
| 8,633,125 B2 | 1/2014 | Kipke et al. | |
| 2002/0035210 A1 | 3/2002 | Silvestri | |
| 2006/0014897 A1 | 1/2006 | Myhre et al. | |
| 2007/0299173 A1* | 12/2007 | Wolfschwenger et al. | ... 524/148 |

FOREIGN PATENT DOCUMENTS

| | | |
|---|---|---|
| CN | 1668689 | 9/2005 |
| CN | 1957034 | 5/2007 |
| CN | 10184268 | 12/2007 |
| EP | 0100843 | 2/1984 |
| EP | 0533154 A1 | 3/1993 |
| EP | 0533155 A1 | 3/1993 |
| EP | 0533156 A1 | 3/1993 |
| EP | 0533160 A1 | 3/1993 |
| EP | 0633272 | 1/1995 |
| JP | 2007-534822 | 11/2007 |
| JP | 2008-013757 | 1/2008 |
| WO | WO 91/02012 | 2/1991 |

(Continued)

OTHER PUBLICATIONS

Pasch, Harald et al., "Analysis of Polyolefin blends by crystallization analysis fractionation", Marcomol. Mater. Eng. 279 2000 , 46-51.

(Continued)

*Primary Examiner* — Robert D. Harlan

(57) ABSTRACT

A polypropylene composition comprising:
A) from 30% to 90% by weight of a propylene polymer composition comprising:
  a1) from 20% to 90% of a propylene homopolymer, or a copolymer of propylene containing 3% or less of derived units of ethylene or $C_4$-$C_{10}$ α-olefin(s) or of combinations thereof, said homopolymer or copolymer having a content of isotactic pentads (mmmm), measured by $^{13}C$ NMR on the fraction insoluble in xylene at 25° C., higher than 96;
  a2) from 10% to 80%, of a copolymer of ethylene containing from 40% to 70% of derived units of propylene or $C_4$-$C_{10}$ α-olefin(s) or of combinations thereof;
B) from 10% to 70% by weight of a multimodal ethylene copolymer wherein the comonomer is selected from the derived units of alpha olefins of formula $CH_2=CHT$ wherein T is a $C_3$-$C_{10}$ alkyl group; having the following properties:
i) density (with ISO 1183) comprised in the range from 0.850 to 0.935 g/cm³;
ii) total comonomer content ranging from 6% to 30% by weight;
iii) content of 1-butene derived units ranging from 0 to 2% by weight;
iv) Mw/Mn comprised from 4 to 20;
v) intrinsic viscosity (decalin at 135° C. as determined according to EN ISO 1628-312003) comprised between 1.0 and 4.0 dL/g, and
C) from 0 to 50% by weight; preferably from 0 to 20% of a filler.

13 Claims, No Drawings

(56) References Cited

FOREIGN PATENT DOCUMENTS

| WO | WO-9102012 | 2/1991 |
| WO | WO-92/00333 | 1/1992 |
| WO | WO-95/32995 | 12/1995 |
| WO | WO-97/04015 | 2/1997 |
| WO | WO-99/21899 | 5/1999 |
| WO | WO-00/31090 | 6/2000 |
| WO | WO-01/21674 | 3/2001 |
| WO | WO-01/62764 | 8/2001 |
| WO | WO-2004/087807 | 10/2004 |
| WO | WO-2005/103095 | 11/2005 |
| WO | WO-2005/103096 | 11/2005 |
| WO | WO-2005/113672 | 12/2005 |
| WO | WO-2006/067023 | 6/2006 |
| WO | WO-2007012406 | 2/2007 |
| WO | WO-2007/060115 | 5/2007 |
| WO | WO-2008/074715 | 6/2008 |
| WO | WO-2008/077530 | 7/2008 |
| WO | WO-2010081676 | 7/2010 |

OTHER PUBLICATIONS

Ratzsch, M. et al., "Bimodal Polymer Materials based on PP and PE", Aufbereiten von Polymeren mit neuartigen Eigenschaften 1995, 1-22(3-25 VDI-Verlag).

Bohm, Ludwig L. et al., "High-Density Polyethylene Pipe Resins", Advanced Materials 4 No. 3 1992, 234-238.

Holtrup, Wolfgang, "Zur Fraktionierung von Polmeren durch Direktextraktion", Makromol. Chem. 178 1977, 2335-2349.

* cited by examiner

POLYMER COMPOSITION

This application is the U.S. national phase of International Application PCT/EP2010/050015, filed Jan. 4, 2010, claiming priority to European Patent Application 09150470.4 filed Jan. 13, 2009, and the benefit under 35 U.S.C. 119(e) of U.S. Provisional Application No. 61/205,227, filed Jan. 20, 2009; the disclosures of International Application PCT/EP2010/050015, European Patent Application 09150470.4 and U.S. Provisional Application No. 61/205,227, each as filed, are incorporated herein by reference.

The present invention relates to a composition comprising a polypropylene-based resin and a polyethylene-based resin, said composition having a excellent impact strength that renders it useful for applications in automotive field, in particular as bumpers exterior and interior trims, luggage and house ware.

As it is known, the isotactic polypropylene, though being endowed with an exceptional combination of excellent properties, is affected by the drawback of possessing an insufficient impact resistance at relatively low temperatures.

According to the teaching of the prior art, it is possible to obviate the said drawback without sensibly affecting the other polymer properties, by properly adding rubbers and polyethylene to the polypropylene.

For example, the U.S. Pat. No. 4,245,062 discloses a process for producing a blend of polypropylene and two different propylene-ethylene copolymers, one of said copolymers substantially forming the rubbery phase. The propylene polymers thus obtained have good impact resistance at low temperature.

In U.S. Pat. No. 4,521,566 a polypropylene composition is disclosed having the following composition:
74 to 91% of crystalline isotactic polypropylene,
6.7 to 19% of an amorphous copolymeric fraction of ethylene and propylene and
1.5 to 8.5% of crystalline polyethylene containing from 50 to 98 of ethylene and exhibiting a crystalline of polyethylene type.

U.S. Pat. No. 4,473,687 discloses polypropylene molding compositions of polypropylene, ethylene-propylene copolymer and polyethylene in different proportions, said composition having high hardness and increased impact strength.

In U.S. Pat. No. 4,734,459 a polypropylene composition having good whitening resistance is disclosed. According to the teaching of the said prior art document, it is possible to improve whitening resistance by replacing the ethylene-propylene copolymer rubber with an ethylene-butene-1 copolymer rubber.

It has now surprisingly been found that it is possible to obtain polypropylene compositions endowed with high impact resistance by using a polyethylene resin having particular features and being produced by a particular catalyst systems.

Thus, an embodiment of the present invention consists of a polymer composition comprising:
A) from 30% to 90% by weight preferably from 40% to 85% by weight more preferably from 55 to 80% by weight of a propylene polymer composition comprising:
a1) from 20% to 90%, preferably from 60% to 80% by weight, of a propylene homopolymer, or a copolymer of propylene containing 3% or less of derived units of ethylene or $C_4$-$C_{10}$ α-olefin(s) or of combinations thereof, a content of isotactic pentads (mmmm), measured by $^{13}C$ NMR on the fraction insoluble in xylene at 25° C., higher than 96%, preferably from 98% to 99.5% and preferably a Polydispersity Index (P.I.) value of from 2 to 10, preferably from 5 to 8 and;
a2) from 10% to 80%, preferably from 20% to 40% by weight, of a copolymer of ethylene containing from 40% to 70%, preferably from 45% to 60% by weight, of derived units of propylene or $C_4$-$C_{10}$ α-olefin(s) or of combinations thereof;
B) from 10% to 70% by weight preferably from 15% to 60% by weight more preferably from 20% to 45% by weight of a multimodal ethylene copolymer wherein the comonomer is selected from the derived units of alpha olefins of formula $CH_2=CHT$ wherein T is a $C_3$-$C_{10}$ alkyl group; having the following properties:
  i) density (with ISO 1183) comprised in the range from 0.850 to 0.935 g/cm³; preferably from 0.880 to 0.935 g/cm³, more preferably from 0.890 and 0.935 g/cm³; even more preferably from 0.910 to 0.935 g/cm³, even more preferably from 0.920 to 0.935 g/cm³;
  ii) total comonomer content ranging from 6% to 30% by weight; preferably from 7% to 20% by weight more preferably ranging from 7% to 16% by weight; more preferably from 7% to 15% by weight; even more preferably from 8 to 10% by weight
  iii) content of 1-butene derived units ranging from 0 to 2% by weight, preferably from 0.1 to 1% by weight;
  iv) Mw/Mn comprised between 4 to 20, preferably between 5 to 20 preferably between 5 to 10; more preferably between 6 to 9
  v) intrinsic viscosity (decalin at 135° C. as determined according to EN ISO 1628-312003) comprised between 1.0 and 4.0 dL/g, preferably between 1.2 and 3 dL/g; and
C) from 0 to 50% by weight; preferably from 0 to 25% by weight; more preferably from 0 to 21% by weight of a filler.

With the composition of the present invention it is possible to achieve materials having high impact strength as shown by the high value of the IZOD measured at –20° C.

Particularly preferred features of the propylene polymer composition A) are:
a molecular weight distribution in component (a1), expressed by the Mw/Mn ratio, measured by GPC, equal to or higher than 7, in particular from 7 to 20;
a value of Mz/Mw ratio in component (a1), measured by GPC, equal to or higher than 3.6, in particular from 3.6 to 7;
Flexural Modulus from 800 to 2000 MPa, more preferably from 900 to 1700 MPa;
Melt Flow Rate (MFR) from 0.5 to 45 g/10 min., more preferably from 2 to 35 g/10 min; even more preferably from 15 to 25 g/10 min. (measured under condition L, namely 230° C., 2.16 kg load);

The propylene polymer composition A) can be prepared according to WO 2004/087807. Preferably the multimodal ethylene copolymer component B) comprises from 10% to 80% by weight preferably from 40% to 80% by weight of a first polyethylene component (HDF) having high density and being detected with the crystaf analysis at a temperature higher than 75° C. and from 90% to 20% by weight preferably from 60% to 20% by weight of a second polyethylene component (LDF) being a copolymer containing from 5 to 39% by weight preferably from 10 to 30% by weight of derived units of alpha olefins of formula $CH_2=CHT$, being detected with the crystaf analysis at a temperature lower than 75° C.;
wherein said multimodal ethylene copolymer being fractionated into 12 fractions by means of the Holtrup analysis, the fractions containing more than 2% by weight of the total amount of material meet the following relationship:

Cf/HDPE>−0.0075HDPE+0.58;

wherein HDPE is the amount of polyethylene homopolymer present in the holtrup fraction and Cf is the amount (% wt) of comonomer of formula $CH_2=CHT$ present in the ethylene copolymer of the Holtrup fraction.

Examples of alpha olefins of formula $CH_2=CHT$ are 1-butene, 1-pentene, 1-hexene, 1-octene, 1-decene, 1-dodecene. Preferred alpha olefins are 1-butene, 1-hexene and 1-octene; more preferably 1-hexene is used.

The multimodal ethylene copolymer component B) shows a multimodal distribution, preferably at least bimodal distribution at TREF analysis. This means that the TREF analysis evidenced at least two maximum peaks.

The total comonomer content of the multimodal copolymer of the present invention ranges from 6% to 30% by weight, preferably from 7% to 20% by weight more preferably ranging from 7% to 16% by weight; more preferably from 7% to 15% by weight; even more preferably from 8 to 10% by weight. When the comonomer content is lower or higher the resulting polymer does not show the optimum distribution between ethylene homopolymer and ethylene copolymer.

The applicant discovered that the 1-butene derived units are present in the copolymer even without adding 1-butene during the polymerization reaction. Without wishing to be bound by a theory it is believed that the 1-butene derived units are due to the dimerization process of ethylene catalyzed by the iron containing catalyst system that is used to obtain the polymer object of the present invention.

The broad molecular weight distribution of the polymer object of the present invention allows a better processability of the polymer. This fact has to be combined with the multimodal composition of the polymer, so that it is possible to improve the processability of the polymer without losing the positive features of the polymers having a narrow distribution of molecular weight.

The intrinsic viscosity (decalin at 135° C. as determined according to EN ISO 1628-312003) is comprised between 1.0 and 4.0 dL/g, preferably between 1.2 and 3 dL/g; lower or higher values of IV does not allow the optimum processability of the copolymer of the present invention.

The multimodal ethylene copolymer object of the present invention is subjected to the solvent-non-solvent extraction method of Holtrup (W. Holtrup, Makromol. Chem. 178, 2335 (1977)). The multimodal ethylene copolymer is fractionated into 12 fractions at different solvent-non-solvent content according to the scheme on the following table:

| Solvent Xylene | Non-solvent Butyldiglychol |
|---|---|
| 75 ml | 325 ml |
| 125 ml | 275 ml |
| 170 ml | 230 ml |
| 200 ml | 200 ml |
| 220 ml | 180 ml |
| 232 ml | 168 ml |
| 240 ml | 160 ml |
| 244 ml | 156 ml |
| 248 ml | 152 ml |
| 252 ml | 148 ml |
| 260 ml | 140 ml |
| 400 ml | — |

Each fraction is then analyzed. The applicant found that when each fraction meets the relationships specified above the resulting product shows better mechanical properties such as elastic modulus, and Charpy notch.

Preferably said multimodal ethylene copolymer being fractionated into 12 fractions by means of the Holtrup analysis, the fractions containing more than 2% by weight of the total amount of material meet the following relationship:

Cf/HDPE>−0.0075HDPE+0.60;

The multimodal ethylene copolymer of the present invention can be used as such or in blend with other polymers such as polypropylene. It can be used for the production of sheets, or for injection moulding due to the high processability.

The multimodal ethylene copolymer of the present invention is obtained by contacting ethylene with an alpha olefins of formula $CH_2=CHT$ wherein T is a $C_3$-$C_{10}$ alkyl group under polymerization conditions in the presence of a catalyst system obtainable by contacting:

A) a metallocene compound of formula (I)

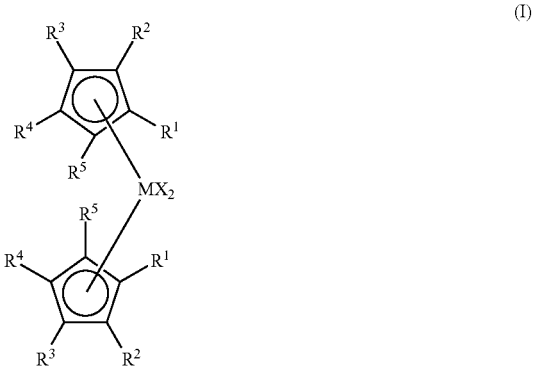

(I)

Wherein
M is titanium, zirconium or hafnium;
X, equal to or different from each other, are hydrogen atoms, halogen atoms, R, OR, $OSO_2CF_3$, OCOR, SR, $NR_2$ or $PR_2$ groups, wherein R is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radical, optionally containing heteroatoms belonging to groups 13-17 of the Periodic Table of the Elements; or two X can optionally form a substituted or unsubstituted butadienyl radical or a OR'O group wherein R' is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a methyl radical;
$R^1$, $R^2$, $R^3$, and $R^4$, equal to or different from each other, are hydrogen atoms or $C_1$-$C_{40}$ hydrocarbon radicals optionally containing heteroatoms belonging to groups 13-17 of the Periodic Table of the Elements;
$R^5$, equal to or different from each other, are hydrogen atoms, $C_1$-$C_{40}$ hydrocarbon radicals optionally containing heteroatoms belonging to groups 13-17 of the Periodic Table of the Elements, or two $R^5$ can be joined to form a bridging divalent group L, wherein L is selected from $C_1$-$C_{20}$ alkylidene, $C_3$-$C_{20}$ cycloalkylidene, $C_6$-$C_{20}$ arylidene, $C_7$-$C_{20}$ alkylarylidene, or a $C_7$-$C_{20}$ arylalkylidene radicals, optionally containing heteroatoms belonging to groups 13-17 of the Periodic Table of the Elements, or it is a silylidene radical containing up to 5 silicon atoms; preferably L is $Si(R^{11})_2$ or $CH_2$—$CH_2$ wherein $R^{11}$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; more preferably L is $Si(CH_3)_2$ or $CH_2$—$CH_2$;

Preferably $R^1$, $R^2$, $R^3$, $R^4$ and $R^5$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^1$, $R^2$, $R^3$, $R^4$ and $R^5$ are hydrogen atoms $C_1$-$C_{10}$-alkyl or $C_6$-$C_{40}$-aryl radicals;

Even more preferably $R^2$, $R^4$, and $R^5$ are hydrogen atoms and $R^1$ and $R^3$ are $C_1$-$C_{10}$-alkyl radicals; preferably R1 is a $C_3$-$C_6$ alkyl radical preferably a butyl radical and $R^3$ is a methyl radical;

B) an iron complexes of the general formula (II)

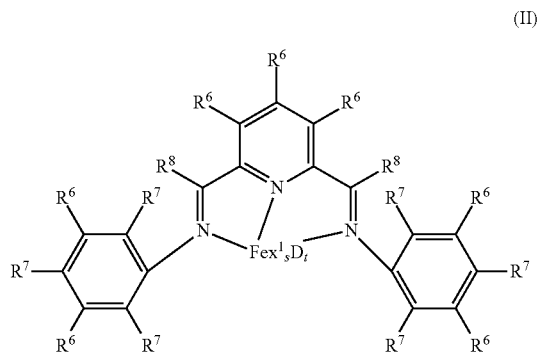

(II)

Wherein:
the radicals $X^1$, equal to or different from each other, are hydrogen atoms, halogen atoms, R, OR, $OSO_2CF_3$, OCOR, SR, $NR_2$ or $PR_2$ groups, wherein R is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radical, optionally containing heteroatoms belonging to groups 13-17 of the Periodic Table of the Elements; or two $X^1$ can optionally form a substituted or unsubstituted butadienyl radical or a OR'O group wherein R' is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals; preferably $X^1$ is a hydrogen atom, a halogen atom or a R group; more preferably X is chlorine or a methyl radical;

D is an uncharged donor; s is 1, 2, 3 or 4, preferably s is 2 or 3; t ranges from 0 to 4, preferably t is 0, 1 or 2.

$R^6$, equal to or different from each other, are hydrogen atoms or $C_1$-$C_{40}$ hydrocarbon radicals optionally containing heteroatoms belonging to groups 13-17 of the Periodic Table of the Elements; preferably $R^6$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^6$ are hydrogen atoms or $C_1$-$C_{10}$-alkyl radicals;

$R^7$, equal to or different from each other, are hydrogen atoms or $C_1$-$C_{40}$ hydrocarbon radicals optionally containing heteroatoms belonging to groups 13-17 of the Periodic Table of the Elements; preferably $R^7$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^7$ are $C_1$-$C_{10}$-alkyl radicals such as methyl or isopropyl radicals;

$R^8$, equal to or different from each other, are hydrogen atoms or $C_1$-$C_{40}$ hydrocarbon radicals optionally containing heteroatoms belonging to groups 13-17 of the Periodic Table of the Elements; preferably $R^8$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^8$ are $C_1$-$C_{10}$-alkyl radicals such as methyl or ethyl;

C) an alumoxane or a compound capable of forming an alkyl cation with complex of formula (I) and (II);
wherein the molar ratio between the metallocene compound of formula (I) and the iron complex of formula (II) (M/Fe ratio) ranges from 5:1 to 30:1; preferably from 10:1 to 20:1.

The alumoxanes used in the catalyst system according to the invention are considered to be linear, branched or cyclic compounds containing at least one group of the type:

wherein the substituents U, same or different, are defined above.

In particular, alumoxanes of the formula:

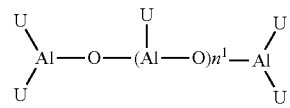

can be used in the case of linear compounds, wherein $n^1$ is 0 or an integer of from 1 to 40 and the substituents U are defined as above; or alumoxanes of the formula:

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2- methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl)aluminium (TDMBA) and tris(2,3,3-trimethylbutyl)aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Tributylammoniumtetra(pentafluorophenyl)aluminate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylcarbeniumtetrakis(pentafluorophenyl)borate,
Triphenylcarbeniumtetrakis(pentafluorophenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

The catalysts system to be used in the process of the present invention can be supported on an inert carrier. This is achieved by depositing the metallocene compound A) and the iron complexes B) or the product of the reaction thereof with the component C), or the component C) and then the metallocene compound A) and the iron complex B) on an inert support. The support can be a porous solid such as talc, a sheet silicate, an inorganic oxide or a finely divided polymer powder (e.g. polyolefin). Suitable inorganic oxides may be found among the oxides of elements of groups 2, 3, 4, 5, 13, 14, 15 and 16 of the Periodic Table of the Elements. Examples of oxides preferred as supports include silicon dioxide, aluminum oxide, and also mixed oxides of the elements calcium, aluminum, silicon, magnesium or titanium and also corresponding oxide mixtures, magnesium halides, styrene/divinylbenzene copolymers, polyethylene or polypropylene. Other inorganic oxides which can be used alone or in combination with the abovementioned preferred oxidic supports are, for example, MgO, $ZrO_2$, $TiO_2$ or $B_2O_3$.

A suitable class of supports which can be used is that constituted by porous organic supports functionalized with groups having active hydrogen atoms. Particularly suitable are those in which the organic support is a partially crosslinked styrene polymer. Supports of this type are described in European application EP-633 272.

Another class of inert supports particularly suitable for use according to the invention is that of polyolefin porous prepolymers, particularly polyethylene.

A further suitable class of inert supports for use according to the invention is that of porous magnesium halides such as those described in International application WO 95/32995.

The support materials used preferably have a specific surface area in the range from 10 to 1000 $m^2/g$, a pore volume in the range from 0.1 to 5 ml/g and a mean particle size of from 1 to 500 μm. Preference is given to supports having a specific surface area in the range from 50 to 500 $m^2/g$, a pore volume in the range from 0.5 to 3.5 ml/g and a mean particle size in the range from 5 to 350 μm. Particular preference is given to supports having a specific surface area in the range from 200 to 400 $m^2/g$, a pore volume in the range from 0.8 to 3.0 ml/g and a mean particle size of from 10 to 300 μm.

The inorganic support can be subjected to a thermal treatment, e.g. to remove adsorbed water. Such a drying treatment is generally carried out at from 80 to 300° C., preferably from 100 to 200° C., with drying at from 100 to 200° C. preferably being carried out under reduced pressure and/or a blanket of inert gas (e.g. nitrogen), or the inorganic support can be calcined at from 200 to 1000° C. to produce the desired structure of the solid and/or set the desired OH concentration on the surface. The support can also be treated chemically using customary desiccants such as metal alkyls, preferably aluminum alkyls, chlorosilanes or $SiCl_4$, or else methylaluminoxane. Appropriate treatment methods are described, for example, in WO 00/31090.

The inorganic support material can also be chemically modified. For example, treatment of silica gel with $(NH_4)_2SiF_6$ leads to fluorination of the silica gel surface, or treatment of silica gels with silanes containing nitrogen-, fluorine- or sulfur-containing groups leads to correspondingly modified silica gel surfaces.

Organic support materials such as finely divided polyolefin powders (e.g. polyethylene, polypropylene or polystyrene) can also be used and are preferably likewise freed of adhering moisture, solvent residues or other impurities by means of appropriate purification and drying operations before use. It is also possible to use functionalized polymer supports, e.g. supports based on polystyrene, via whose functional groups, for example ammonium or hydroxy groups, at least one of the catalyst components can be immobilized. The solid compound obtained by supporting the catalyst system object of the present invention on a carrier in combination with the further addition of the alkylaluminium compound either as such or prereacted with water if necessary, can be usefully.

The molar ratio between the metallocene compound of formula (I) and the iron complex of formula (II) (M/Fe molar ratio) ranges from 2:1 to 20:1; preferably from 4:1 to 15:1; more preferably from 6:1 to 11:1; even more preferably from 6:1 to 8:1.

The process of the invention for polymerizing ethylene with 1-alkenes of formula $CH_2=CHT$ can be carried out using all industrially known polymerization methods at temperatures in the range from −60 to 350° C., preferably from 0 to 200° C. and particularly preferably from 25 to 150° C., and under pressures of from 0.5 to 4000 bar, preferably from 1 to 100 bar and particularly preferably from 3 to 40 bar. The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes and gas-phase fluidized-bed processes are all possible.

The polymerizations are usually carried out at temperatures in the range from −60 to 350° C., preferably in the range from 20 to 300° C., and under pressures of from 0.5 to 4000 bar. The mean residence times are usually from 0.5 to 5 hours, preferably from 0.5 to 3 hours. The advantageous pressure and temperature ranges for carrying out the polymerizations usually depend on the polymerization method. In the case of high-pressure polymerization processes, which are customarily carried out at pressures of from 1000 to 4000 bar, in particular from 2000 to 3500 bar, high polymerization temperatures are generally also set. Advantageous temperature ranges for these high-pressure polymerization processes are from 200 to 320° C., in particular from 220 to 290° C. In the case of low-pressure polymerization processes, it is usual to set a temperature which is at least a few degrees below the softening temperature of the polymer. In particular, temperatures of from 50 to 180° C., preferably from 70 to 120° C., are set in these polymerization processes. In the case of suspension polymerizations, the polymerization is usually carried out in a suspension medium, preferably an inert hydrocarbon such as isobutane or mixtures of hydrocarbons or else in the monomers themselves. The polymerization temperatures are generally in the range from −20 to 115° C., and the pressure is generally in the range from 1 to 100 bar. The solids content of the suspension is generally in the range from 10 to 80%. The polymerization can be carried out either batchwise, e.g. in stirring autoclaves, or continuously, e.g. in tube reactors, preferably in loop reactors. Particular preference is given to employing the Phillips PF process as described in U.S. Pat. No. 3,242,150 and U.S. Pat. No. 3,248,179. The gas-phase polymerization is generally carried out in the range from 30 to 125° C. at pressures of from 1 to 50 bar.

Among the abovementioned polymerization processes, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or supercondensed mode, in which part of the circulating gas is cooled to below the dew point and is recirculated as a two-phase mixture to the reactor. Furthermore, it is possible to use a multizone reactor in which the two polymerization zones are linked to one another and the polymer is passed alternately through these two zones a number of times. The two zones can also have different polymerization conditions. Such a reactor is described, for example, in WO 97/04015. The different or identical polymerization processes can also, if desired, be connected in series so as to form a polymerization cascade, for example as in the Hostalen® process. A parallel reactor arrangement using two or more identical or different processes is also possible. Furthermore, molar mass regulators, for example hydrogen, or customary additives such as antistatics can also be used in the polymerizations. Hydrogen can especially be used to enhance the activity of the hafnocene (A). The hydrogen and increased temperature usually lead to lower z-average molar mass.

The polymerization is preferably carried out in a single reactor, in particular in a gas-phase reactor. The polymerization of ethylene with 1-alkenes having from 3 to 10 carbon atoms gives the polyethylene of the invention when the catalyst of the invention is used. The polyethylene powder obtained directly from the reactor displays a very high homogeneity, so that, unlike the case of cascade processes, subsequent extrusion is not necessary in order to obtain a homogeneous product.

The production of polymer blends by intimate mixing of individual components, for example by melt extrusion in an extruder or kneader (cf., for example, "Polymer Blends" in Ullmann's Encyclopedia of Industrial Chemistry, $6^{th}$ Edition, 1998, Electronic Release), is often accompanied by particular difficulties. The melt viscosities of the high and low molecular weight components of a bimodal polyethylene blend are extremely different. While the low molecular weight component is quite fluid at the customary temperatures of about 190-210° C. used for producing the blends, the high molecular weight component is only softened ("lentil soup"). Homogeneous mixing of the two components is therefore for very difficult. In addition, it is known that the high molecular weight component can easily be damaged as a result of thermal stress and by shear forces in the extruder, so that the properties of the blend are adversely affected. The mixing quality of such polyethylene blends is therefore often unsatisfactory.

The preparation of the polyethylene component B) in the reactor reduces the energy consumption, requires no subsequent blending processes and makes simple control of the molecular weight distributions and the molecular weight fractions of the various polymers possible. In addition, good mixing of the polyethylene is achieved.

The composition of the present invention may further comprise of from 0 to 30% by weight, preferably 0.1 to 3 by weight of auxiliaries and/or additives known per se, e.g. processing stabilizers, stabilizers against the effects of light and heat, customary additives such as lubricants, antioxidants, antiblocking agents and antistatics, and also, if appropriate, dyes.

In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are the p-tert.-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers (component C), such as talc, calcium carbonate and mineral fibers, also brings about an improvement to some mechanical properties, such as Flexural Modulus and HDT. Talc can also have a nucleating effect.

The composition according to the present invention is particularly useful in producing moulded and/or extruded articles by employing of conventional injection moulding, blow moulding and/or extrusion techniques. Preferably, these articles are body parts for automotive applications, either exterior or interior parts. The exterior parts may be bumper covers, exterior fascia, air dams, and other trim, the interior parts dash boards, air bag covers and the like.

The following examples are given for illustrative purposes and do not intend to limit the scope of the invention.

EXAMPLES

NMR

NMR samples were placed in tubes under inert gas and, if appropriate, melted. The solvent signals served as internal standard in the $^1$H- and $^{13}$C-NMR spectra and their chemical shift was converted into the values relative to TMS.

Polyethylene Homopolymer (HDPE) Content

The HDPE content in each Holtrup fraction has been measured by subjecting each fraction to the Crystaf® analysis, the fraction detected at a temperature higher than 80° C. was considered as HDPE.

Density

The density [g/cm$^3$] was determined in accordance with ISO 1183.

GPC

The determination of the molar mass distributions and the means Mn, Mw, M$_z$ and Mw/Mn derived therefrom was carried out by means of high-temperature gel permeation chromatography on a WATERS 150 C using a method based on DIN 55672 and the following columns connected in series: 3× SHODEX AT 806 MS, 1× SHODEX UT 807 and 1× SHODEX AT-G under the following conditions: solvent: 1,2,4-trichlorobenzene (stabilized with 0.025% by weight of 2,6-di-tert-butyl-4-methylphenol), flow: 1 ml/min, 500 μl injection volume, temperature: 140° C. The columns were calibrated with polyethylene standards with molar masses of from 100 bis 10$^7$ g/mol. The evaluation was carried out by using the Win-GPC software of Fa. HS-Entwicklungsgesellschaft für wissenschaftliche Hard-und Software mbH, Ober-Hilbersheim.

MFR

The Melt Flow Rate was determined at 190° C. under a load of 21.6 kg (190° C./21.6 kg) in accordance with ISO 1133.

Holtrup Analysis

Solvent-Non-Solvent Fractionation (Molecular Mass Fractionation):

The analysis was carried out according the procedure given in the literature by Holtrup (W. Holtrup, Zur Fraktionierung von Polymeren durch Direktextraktion, Makromol. Chem. 178, 2335-2349 (1977)).

The detailed procedure which was used is as follows:

The extraction was carried out in an apparatus described here in detail:

It consists of a thermocontrolled fractionation pot, a solvent reservoir pot and a vibromixer.

Fractionation pot and solvent reservoir pot are equipped with a jacket to allow thermostated operation of the fractionation process.

The fractionation pot has at the bottom a discharge valve and there is a quartz wool filter covered with a perforated metal plate (1 cm thick; hole diameter 4 mm) on the bottom of the fractionation pot. The mixing plate is mounted 1 cm above the quartz wool filter. The transportation initiated by the mixing plate is directed to the bottom of the fractionation pot.

The vibromixer unit is able to ensure a homogenous mixture of the precipitated polymer in the solvent (the slurry).

The Process:

The polymer sample is transferred into the fractionation pot; temperature is elevated in the jacket of the fractionation pot; the temperature internally is controlled to 130° C. and the first solvent mixture (400 ml in total) is transferred into the fractionation pot. The solvent mixture is preheated to 130° C. in the solvent reservoir pot. The mixing device (vibromixer) is started. It is to be controlled that the polymer material is distributed all over the solvent mixture. The extraction is carried out for 20 min. Afterwards the formed solphase is transferred through the opened valve of the fractionation pot into a erlenmeyer flask which is filled with 500 ml of cold acetone (T=-10° C.). The vibromixer is stopped in this moment. The slurry is stirred and the polymer precipitates. During the transfer the vibromixer is kept in operation to prevent a build up of a block on the filter. The precipitated polymer acetone slurry is filtered afterwards over a suction filter and separated from the solvent mixture by this. The polymer is dried under vacuum at 80° C. for 12 h.

After closing the bottom valve the next already preheated solvent-non-solvent mixture (typically higher in xylene concentration) is transferred from the preheating pot into the extraction pot. The vibromixer is started and the whole procedure is repeated.

The whole procedure of extracting and filtering is repeated several times acc. to the recipe and in the last step an extraction with pure xylene is done.

400 ml of solvent mixture is used; in the last step 400 ml of xylene.

The following mixtures have been used

|    | Solvent Xylene | Non-solvent Butyldiglychol |
|----|----------------|----------------------------|
| 1  | 75 ml          | 325 ml                     |
| 2  | 125 ml         | 275 ml                     |
| 3  | 170 ml         | 230 ml                     |
| 4  | 200 ml         | 200 ml                     |
| 5  | 220 ml         | 180 ml                     |
| 6  | 232 ml         | 168 ml                     |
| 7  | 240 ml         | 160 ml                     |
| 8  | 244 ml         | 156 ml                     |
| 9  | 248 ml         | 152 ml                     |
| 10 | 252 ml         | 148 ml                     |
| 11 | 260 ml         | 140 ml                     |
| 12 | 400 ml         | —                          |

Xylene Soluble and Insoluble Fractions 2.5 g of polymer and 250 cm³ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm³ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

TREF Analysis

The TREF analysis were carried out under the following conditions: solvent 1,2,4-trichlorobenzene, flow: 1 ml/min, heating rate: 1° C./min, amount of polymer 5-10 mg, support: silica gel.

Crystaf Analysis

Crystallization Analysis Fractionation (CRYSTAF) technique involves dissolving a sample in a solvent at high temperature, then cooling the solution slowly to cause fractionation of the sample based on solubility. For semi-crystalline samples, including blends, solubility depends primarily on crystallizability: portions of the sample that are more crystalline will precipitate out of solution at a higher temperature than portions of the sample that are less crystalline.

The relative amount of sample in solution as a function of temperature is measured using an infrared (IR) detector to obtain the cumulative solubility distribution. The soluble fraction (SF) is defined as the IR signal at the lowest temperature (at 0° C.) divided by the IR signal when all the sample is dissolved at high temperature, and corresponds to the weight fraction of sample that has not crystallized.

A commercial CRYSTAF 200 instrument (Polymer Char S. A., Valencia, Spain) with five stirred stainless steel vessels of 60 mL volume was used to perform this test. The technique is outlined in Harald Pasch*, Robert Brüll[2], Udo Wahner[2], Benjamin Monrabal[3] MACROMOL. MATER. E NG. 279, 46-51 (2000).

In contrast to the procedure in the literature given approximately 15 mg of sample were dissolved for 60 min at 160° C. in 30 mL of 1,2-dichlorobenzene. The solution was then stabilized for 90 min at 95° C.

The crystallization was carried out from 95 to 30° C. at a crystallization rate of 0.1° C./min.

A dual wavelength infrared detector with a heated flow through cell maintained at 150° C. was used to measure the polymer concentration in solution at regular intervals during the crystallization cycle; the measuring wavelength was 3.5 μm and the reference wavelength was 3.6 μm. The cumulative soluble concentration is measured as the polymer crystallizes while the temperature is decreased.

The CRYSTAF peak temperature and area are identified by the peak analysis module included in the CRYSTAF Software (Version 200 Lbˆ PolymerChar, Valencia, Spain). The CRYSTAF peak finding routine identifies a peak temperature as a maximum in the dW/dT and the area between the largest positive inflections on either side of the identified peak in the derivative curve.

Comonomer Content

Comonomer content has been measured via NMR

Propylene Polymer Composition A)

The propylene polymer composition A) has been prepared in analogy of example 1 of WO 2004/087807 by changing residence time, ethylene feeding and hydrogen feeding so that to achieve the product described in table 1. The features of the polymer has been measured according to the procedures reported on the same document. The features of components a1 and a2 have been reported in table 1

TABLE 1

|  | Component a1 | Component a2 | Component A |
|---|---|---|---|
| Ethylene content % wt | 0 | 50 | 15 |
| Polydispersity index P.I. | 6 | nm | nm |
| Xylene insolubles X.I. % wt | 98 | nm | 74 |
| mmmm of xylene insolubles % | 98.8 | nm | nm |
| Mw/Mn | 15.1 | nm | nm |
| Mz/Mn | 4.7 | nm | nm |
| Split | 70 | 30 | nm |
| Flexural Modulus MPa | nm | nm | >950 |
| MFR (g/10') | nm | nm | 16.5 | nm = not measured

Multimodal Ethylene Copolymer B)

Preparation of the Catalyst Systems

Component A)

Bis(n-butyl-cyclopentadienyl)hafnium dichloride is commercially available from Chemtura Inc. Component B)

2,6-Bis[1-(2-Chlor-4,6-trimethylphenylimino)ethyl]pyridine was prepared as in example 1 of WO 98/27124 and reacted in an analogous manner with iron(II) chloride to give 2,6-2,6-Bis[1-(2-Chlor-4,6-trimethylphenylimino)ethyl]pyridine iron(II) dichloride, as likewise disclosed in WO98/27124.

Component C)

Methylalumoxane (MAO) was received from Albemarle as a 30% wt/wt toluene solution.

Support Pretreatment

XPO-2107, a spray-dried silica gel from Grace, was calcined at 600° C. for 6 hours and subsequently 2.5 Kg of the dried silica gel were put into a 10 L vessel and cooled at 10° C.

Preparation of the Catalyst System 1

In a 3.09 L reactor 3.3 Kg MAO (4.75 M in Toluene, 0.78 mol) were added. In a separated 0.5 L flask 73.7 g. component A were mixed with 12.7 g component B. The powder was transferred to the 3.09 L steel reactor and the flask flushed with 500 ml Toluene.

The mixture was stirred, cooled to −30° C. for one hour, then poured into the 10 L reactor very slowly "dropwise". The mixture was stirred for another 2 h. The resulting catalyst (5.4 Kg) was a free flowing powder and still contained 36% by weight of solvent (based on the total weight and calculated on the basis of complete application of all components to the support) and had an ivory colour. The content of hafnium was 60 μmol/g, the content of Iron was of 9 μmol/g. The molar ratio Hf+Fe:Al was of 69:90.

Example 2

Polymerization

The polymerization of catalyst 1 was carried out in a fluidized-bed reactor having a diameter of 0.5 m. The polymerization temperature was 100° C. and the total pressure of the reactor was 24 bar-g. The catalyst 1 was injected and 0.25 g of triisobutylaluminum per hour were metered. Comonomer used is 1-Hexene. Propane has been used as inert gas. The output productivity and the composition of the reactor gas are reported in table 2.

TABLE 2

| ex | Gas speed m³/h | Ethylene (% by vol) | 1-hexene/ Ethylene ratio (% by vol) | Propane (% by vol) | Productivity g/g of cat |
|---|---|---|---|---|---|
| 1 | 330 | 57.7 | 0.11 | 36 | 1200 |

The polymers of example 1 has been with extruded in pellets and stabilized with the following composition:

| | | |
|---|---|---|
| 500 | ppm | Ca-Stearate |
| 1600 | ppm | Hostanox PAR 24 FF |
| 800 | ppm | Irganox 1010 |
| 500 | ppm | Zn-Stearate |

Then the polymers of examples 1 and 2 have been analyzed the results are reported on table 3

| | Example 1 |
|---|---|
| Density g/cm3 | 0.929 |
| Melt Flow Rate (MFR) (@2.16 kg, 190° C.) g/10' | 1.16 |
| | 7.5 |
| 1-butene derived units % wt | <1 |
| Mw/Mn | 10.3 |
| IV dL/g | 1.79 |
| HDF wt % | 38 |
| TREF analysis | Two maximum peaks |
| Comonomer content LDF wt % | 11.7 |

Samples of the polymers have been fractionated by using the Holtrup analysis according to the procedure reported above. The results are reported on table 4

TABLE 4

| Fraction of ex 2 | IV [d/g] | C % [wt %] | HDF [wt %] | Cf [wt %] | Cf/HDPE | C %/IV | −0.0075* HDPE + 0.58 | % of material |
|---|---|---|---|---|---|---|---|---|
| 1 | nm | Nm | nm | Nm | nm | nm | nm | 1.54 |
| 2 | nm | Nm | nm | Nm | nm | nm | nm | 1.87 |
| 3 | 0.35 | 3 | 66 | 8.82 | 0.13 | 8.57 | 0.09 | 8.85 |
| 4 | 0.72 | 6.1 | 56 | 13.86 | 0.25 | 8.47 | 0.16 | 19.53 |
| 5 | 1.74 | 9.5 | 28 | 13.19 | 0.47 | 5.46 | 0.37 | 35.96 |
| 6 | 3.03 | 8.4 | 17 | 10.12 | 0.60 | 2.77 | 0.45 | 26.89 |
| 7 | 3.55 | 7.6 | 44 | 13.57 | 0.31 | 2.20 | 0.25 | 4.42 |
| 8 | nm | nm | nm | Nm | nm | nm | nm | 0.75 |
| 9 | nm | Nm | nm | Nm | nm | nm | nm | 0.05 |
| 10 | nm | Nm | nm | Nm | nm | nm | nm | 0.01 |
| 11 | nm | Nm | nm | Nm | nm | nm | nm | 0 |
| 12 | nm | Nm | nm | Nm | nm | nm | nm | 0 | nm = not measured

Example 1

Preparation of the Polypropylene Composition

52% wt of polymer composition A), 35% wt of multimodal ethylene copolymer B) and 12% wt of Talc have been blended and subjected to extrusion/granulation in a twin screw extruder (L/D=35) in the presence of 0.028% by weight of calcium stearate, 0.1 wt % of Irganox® 1010 and 0.1 wt % of Irganox® 1076. The resulting polymer has been analyzed. The analysis are reported on table 5

TABLE 5

| Analysis | Units | Ex 1 |
|---|---|---|
| IZOD −20° C. A 48 h (ISO 180) | KJ/M2 | 30.3 |
| Stress at Yield (ISO 527) | N/MM2 | 16 |
| Elongation at break (ISO 527) | % | 570 |
| Flexural modulus ISO 178 | MPa | 1150 |
| Ash (ISO 3451) | Wt % | 11.2 |

Comparative Example 1

52% wt of polymer composition A), and 12% wt of Talc have been blended with the polymer composition obtained in example 2 (comp polymer B)) of U.S. Pat. No. 5,360,868, the analysis of the resulting blend has been reported on table 7. The properties of the comp. polymer B) are reported on table 6

TABLE 6

| property | Value | method |
|---|---|---|
| density | 0.89 g/cm3 | ISO 1183 (method A) |
| melt flow rate | 7.5 g/10' | ISO 1133 |
| flexural Modulus | 470 MPa | ISO 178 |
| tensile strain at break | >500% | ISO 527-1, -2 |
| bipolymer split | 68% wt | process calculation |
| matrix split | 32% wt | process calculation |
| IR C6 content | 0% wt | |
| IR C4 content | 10.9% wt | |
| IR C2 content | 57.7% wt | |
| Xylene Soluble 25° C. | 23.5% wt | |
| Xylene Soluble IV | 1.34 dl/g | |

TABLE 7

| Analysis | Units | comp polymer B |
|---|---|---|
| IZOD −20° C. A 48 h (ISO 180) | KJ/M2 | 6.9 |
| Stress at Yield (ISO 527) | N/MM2 | 16.7 |
| Elongation at break (ISO 527) | % | 525 |
| Flexural modulus ISO 178 | MPa | 1180 |
| Ash (ISO 3451) | Wt % | 11.5 |

By comparing the results of table 5 and table 7 it can be seen that the Izod of the composition according to the present invention is considerably higher than that one of the comparative example 1.

The invention claimed is:

1. A polyolefin composition comprising:
   A) from 30% to 90% by weight of a propylene polymer composition A) comprising:
      a1) from 20% to 90% of a propylene homopolymer, or a copolymer of propylene containing 3% or less of derived units of ethylene or $C_4$-$C_{10}$ α-olefin(s) or of combinations thereof, said homopolymer or copolymer having a content of isotactic pentads (mmmm), measured by $^{13}C$ NMR on the fraction insoluble in xylene at 25° C., higher than 96%;
      a2) from 10% to 80%, of a copolymer of ethylene containing from 40% to 70% of derived units of propylene or $C_4$-$C_{10}$ α-olefin(s) or of combinations thereof, wherein the propylene polymer composition A) has a melt flow rate from 15 to 45 g/10 min; and
   B) from 10% to 70% by weight of a multimodal ethylene copolymer wherein the comonomer is selected from the derived units of alpha olefins of formula $CH_2$=CHT wherein T is a $C_3$-$C_{10}$ alkyl group; having the following properties:
      i) a density (with ISO 1183) from 0.850 to 0.935 g/cm$^3$;
      ii) a total comonomer content from 6% to 30% by weight;
      iii) a content of 1-butene derived units from 0 to 2% by weight;
      iv) a Mw/Mn from 4 to 20; and
      v) an intrinsic viscosity (decalin at 135° C. as determined according to EN ISO 1628-312003) between 1.0 and 4.0 dL/g, and
   C) from 0 to 50% by weight of a filler.

2. The polypropylene composition according to claim 1 wherein the propylene polymer composition A) further comprises:
   a molecular weight distribution in component (a1), measured by GPC, equal to higher than 3.6;
   a value of Mz/Mw ratio in component (a1), measured by GPC, equal to or higher than 3.6;
   a Flexural Modulus from 800 to 2000 MPa; and
   a Melt Flow Rate (MFR) from 15 to 25 g/10 min (measured under condition L, namely 230° C., 2.16 kg load).

3. The polypropylene composition according to claim 1 wherein the amount of polymer A) is between 60% to 80% by weight and the amount of polymer B) is between 15% to 60% by weight.

4. The polypropylene composition according to claim 1 wherein the amount of component a1) is between 60% to 80% by weight and the amount of component a2) is between 20% and 40% by weight.

5. The polypropylene composition according to claim 1 wherein in component a1) the Polydispersity Index (P.I.) ranges from 5 to 8 and a content of isotactic pentads (mmmm), measured by $^{13}C$ NMR on the fraction insoluble in xylene at 25° C. is higher than 99.5%.

6. The polypropylene composition according to claim 1 wherein component a2) contains from 45% to 60% by weight, of derived units of propylene or $C_4$-$C_{10}$ α-olefins(s) or of combinations thereof.

7. The polypropylene composition according to claim 1 wherein in component B) the density (with ISO 1183) is comprised in the range from 0.880 to 09.35 g/cm$^3$.

8. The polypropylene composition according to claim 1 wherein in component B) the total comonomer content ranges from 7% to 20% by weight.

9. The polypropylene composition according to claim 1 wherein component B) the content of 1-butene drived units ranges from 0.1 to 1% by weight.

10. The polypropylene composition according to claim 1 wherein Mw/Mn is comprised between 4 to 20.

11. The polypropylene composition according to claim 1 wherein the multimodal ethylene copolymer component B) further comprises form 10% to 80% by weight of a first polyethylene component (HDF) having high density and being detected with the crystaf analysis at a temperature higher than 75° C. and from 90% to 20% by weight of a second polyethylene component (LDF) being a copolymer containing from 5 to 39% by weight of derived units of alpha olefins of formula $CH_2$=CHT, being detected with the crystaf analysis at a temperature lower than 75° C.

12. The polypropylene composition according to claim 1 wherein, when the multimodal ethylene copolymer component B) is fractionated into 12 fractions by means of the Holtrup analysis, the fractions containing more than 2% by weight of the total amount of material meet the following relationship:

$$Cf/HDPE > -0.0075 HDPE + 0.58;$$

wherein HDPE is the amount of polyethylene homopolymer present in the Holtrup fraction and CF is the amount (% wt) of comonomer of formula $CH_2$=CHT present in the ethylene copolymer of the Holtrup fraction.

13. The polypropylene composition according to claim 1 wherein in the multimodal ethylene copolymer component B) the alpha olefins of formula $CH_2$=CHT are 1-butene, 1-pentene, 1-hexene, 1-octene, 1-decene, or 1-dodecene.

* * * * *